United States Patent [19]

Junek

[11] 3,867,589

[45] Feb. 18, 1975

[54] ENHANCING IMPEDANCE CHARACTERISTICS OF NEGATIVE IMPEDANCE REPEATERS OPERATING AT HIGH GAIN

[75] Inventor: Peter G. Junek, Raleigh, N.C.

[73] Assignee: Astrocom Division of Q.C.P. Ltd., Walhalla, N. Dak.

[22] Filed: Sept. 4, 1973

[21] Appl. No.: 393,982

[30] Foreign Application Priority Data

Aug. 8, 1973 Canada ............................... 178303

[52] U.S. Cl. .................... 179/175.31 R, 179/170 G

[51] Int. Cl. .............................................. H04b 3/46

[58] Field of Search .......... 179/175.31 E, 175.31 R, 179/170.2, 170 G; 178/70 R, 71 R, 71 T; 333/80 R

[56] References Cited

UNITED STATES PATENTS

| | | | |
|---|---|---|---|
| 1,572,992 | 2/1926 | Crisson et al. | 179/175.31 E |
| 2,844,669 | 7/1958 | Arndt | 179/175.31 R |
| 2,998,581 | 8/1961 | Dimmer | 179/170 G |
| 3,042,759 | 7/1962 | Bonner | 179/170 G |

OTHER PUBLICATIONS

Roback: "Test . . . Set For . . . Negative–Impedance Repeaters," Auto. Elec. Tech. Jour. Vol. 7, No. 7, July, 1961; p. 258–262.

*Primary Examiner*—Thomas A. Robinson
*Attorney, Agent, or Firm*—Molinare, Allegretti, Newitt & Witcoff

[57] ABSTRACT

An alignment procedure for improving the high-gain impedance characteristics of a telephone repeater of the type employing both series-and shunt-connected negative impedance converters. Temporary terminating resistors are connected to each converter such that the repeater is operated at approximately 75–80 percent of its maximum gain with its transmission line terminals connected to a desired nominal image impedance. Using variable decade resistors and a return loss measuring set, small variations in the net terminating resistances of each of the two converters are made until return loss is maximized, thereby determining the values of permanent, fixed-value, impedance-optimizing resistors which are then interconnected with and become a permanent part of the repeater's strapping networks.

9 Claims, 5 Drawing Figures

ENHANCING IMPEDANCE CHARACTERISTICS OF NEGATIVE IMPEDANCE REPEATERS OPERATING AT HIGH GAIN

BACKGROUND OF THE INVENTION

This invention relates to amplifiers or "repeaters" of the kind used in telephone transmission facilities. In particular, the present invention pertains to methods and apparatus for improving the impedance match between negative impedance repeaters and the transmission line in which they are connected.

Telephone repeaters which employ the combination of both series-connected and shunt-connected negative impedance converters are widely used to reduce transmission losses in exchange area telephone cable circuits. Typical repeaters of this class are described in the following U.S. Pat. Nos.: 3,042,759 issued to A. L. Bonner, 2,998,581 issued to R. P. Dimmer, 3,024,324 issued to R. P. Dimmer, 2,878,325 issued to J. L. Merrill, Jr.
The above-noted Bonner patent discloses the "E6" repeater which is used in the Bell System. Further details on the design, construction and use of this repeater are presented in an article entitled "The E6 Negative Impedance Repeater" by Bonner, Garrison and Kapp, pp. 1,445–1,504, of the Bell System Technical Journal, November, 1960.

The present invention represents an improvement in the design and construction of (and in the procedures for adjusting) repeaters of this general class.

The series-connected and shunt-connected negative impedance converters used in such repeaters each have gain and impedance characteristics which may be varied by altering the values of terminating resistances. These terminating resistances commonly take the form of "strapping networks" made up of a combination of fixed-value resistors which may be interconnected in a variety of ways, to provide a desired net terminating resistance. These network connections may be made by appropriate manipulation of strapping terminals accessible from the exterior of the repeater housing. Commonly, the gain required of a given repeater is calculated from the cable records and, once the desired gain is determined, the repeater is "strapped" to provide that gain according to rules provided in "strapping tables."

Not only must the desired gain be achieved, but the image impedance of the repeater must be matched to the impedance actually presented by the telephone cable facility. In repeaters of the E6 class, this is normally accomplished by "building out" the transmission line through the addition of a line building-out network, or "LBO," which transforms the actual cable impedance into a desired nominal image impedance. In the exchange area telephone plant facilities, the nominal image impedance is commonly equal to the series combination of 900 ohm resistance and a 2.16 microfarad capacitance. Such LBO networks can be, and often are, included within the repeater housing. Like the resistor networks terminating the negative impedance converters, such LBO's often comprise a combination of fixed impedances which are interconnectable by manipulating a strapping board accessible from outside the repeater housing.

The negative impedance repeater should therefore be matched to the nominal image impedance of the built-out cable in order that undesirable reflections or echo effects be avoided. Mathematical relationships, based upon the representation of the repeater as a bridged-T network configuration with mutual coupling, can be and have been written to express the image impedance of such a repeater. These formulations show that the image impedance of the repeater is equal to the square root of the product of the individual impedances of the series- and shunt-connected converters. It can be further shown, using such idealized formulations, that the desired image impedance should be obtained, and echo effects hence minimized, when the insertions gains of the shunt and series converters are made equal. The conventional design practice has thus made use of these formulations in the design of the terminating resistance strapping networks. Moreover, where it has been desired to improve the performance of a repeater by making adjustments in the field, the accepted practice has been to adjust the terminating resistances in the converters such that the insertion gains of the two converters are equal.

While repeaters terminated in this way have proven to have excellent impedance characteristics at low gains, their impedance characteristics deteriorate markedly at higher gains. The reason for this deterioration stems from the fact that the idealized mathematical relationships used, while they well describe the operation of the repeaters at low gain, provide a much poorer approximation of the actual performance of a real repeater operating at higher gains.

SUMMARY OF THE INVENTION

It is accordingly the principal objective of the present invention to improve the performance in negative impedance repeaters of this class through the provision of an improved terminating network and the procedure for determining the desired component values for that network.

In a principal aspect, the present invention takes the form of a negative impedance repeater in which a fixed-value impedance-optimizing resistor is added to the gain adjusting resistor network terminating each negative impedance converter, the effect of these added resistors being to mutually adjust the insertion impedances of the shunt- and series-connected converters such that the desired image impedance is more nearly approximated at higher gains.

BRIEF DESCRIPTION OF DRAWINGS

These and other objects, features, and advantages of the invention will become more apparent by considering the following detailed description as presented in conjunction with the attached drawings in which.

DESCRIPTION OF THE PREFERRED EMBODIMENT

Figure 1:
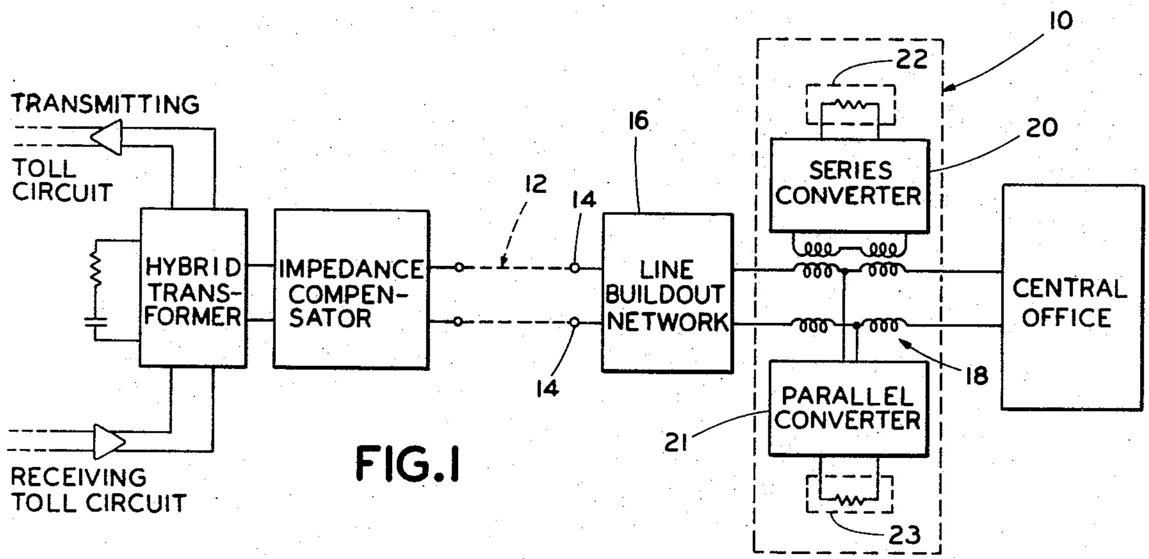
FIG. 1 is a schematic diagram showing a typical negative impedance repeater installation in which the repeater is connected to the local office end of a toll-connecting trunk circuit.

FIG. 1 of the drawings shows a negative impedance repeater indicated generally at 10 connected at the central office end of a toll connecting trunk cable indicated generally at 12. Because the impedance presented by the trunk cable at terminals 14 is a complex function of the length of the cable end-section, loading and cable conductor size, a line building-out network 16 is employed to transform the impedance of the trunk cable at terminals 14 into a nominal image impedance (commonly equivalent to 900 ohms in series with 2.16 microfarads). Accordingly, the impedance appearing at the junction of the LBO 16 and the repeater 10, as well as the impedance presented by the central office, is equal to this nominal image impedance.

The repeater 10 includes a series-connected converter 20 and a shunt-connected converter 21, which are coupled to the transmission line by means of a balanced line transformer indicated generally at 18. Both converters 20 and 21 effectively transform the positive impedances presented by terminating networks 22 and 23 respectively into negative impedances.

Figure 2:
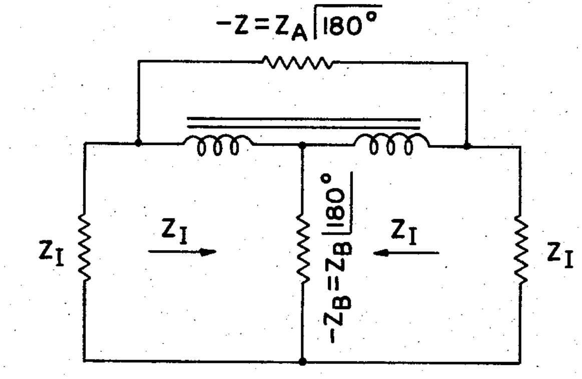
FIG. 2 is a schematic diagram of a bridged-T network commonly used as an idealized equivalent circuit for a repeater employing shunt-connected and series-connected negative impedance converters.

The negative impedance repeater 10 may be represented, for purposes of analysis, by a bridged-T network of the type shown in FIG. 2. If $Z_A$ and $Z_B$ are used to respectively represent the magnitude of the series-connected and shunt-connected negative impedances, the image impedance $Z_I$ is given by the relationship:

$$Z_I = \sqrt{Z_A Z_B}$$

The insertion gain of such a bridged-T configuration is given:

$$\text{Gain (in decibels)} = 20\text{LOG}_{10} \left| (1 - \sqrt{Z_A/4Z_B})/(1 + \sqrt{Z_A/4Z_B}) \right|$$

Figure 3A:
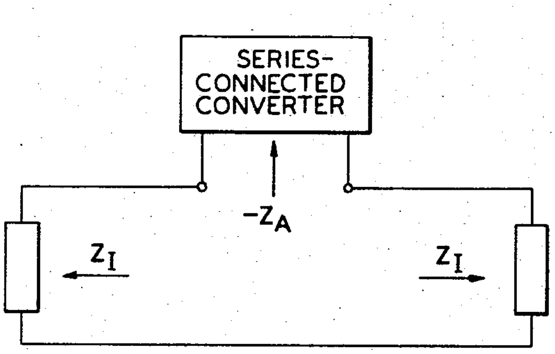
FIGS. 3A and 3B respectively show circuit arrangements employed in the past to measure the individual insertion gains of series-connected and shunt-connected converters.
Figure 3B:
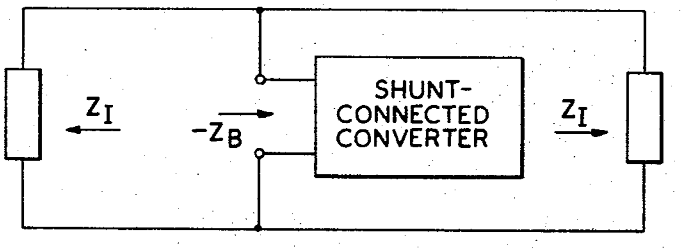

If the insertion gain of the individual converters was measured with those converters connected as shown in FIGS. 3A and 3B, their individual insertion gains may be shown to be, for the series converter:

$$\text{Series Converter Gain (in decibels)} = 20\text{LOG}_{10}\ 2Z_I/2Z_I - Z_A$$

And for the shunt-connected converter:

$$\text{Shunt Converter Gain (in decibels)} = 20\text{LOG}_{10} -Z_B/(-Z_B + Z_I/2)$$

If these individual gains are set equal to each other, then:

$$20\text{LOG}_{10}\ (2Z_I/2Z_I - Z_A) = 20\text{LOG}_{10}\ [-Z_B/(-Z_B + Z_I/2)]$$

Solving for $Z_I$, the known relationship for the image impedance of a bridged-T converter results:

$$Z_I = \sqrt{Z_A Z_B}$$

Thus, by adjusting the individual insertion gains on the shunt-connected and series-connected converter to be equal to one another, the desired image impedance for the overall repeater is theoretically obtained.

In practice, however, it has been found that, as the gain of a real repeater is increased, its impedance characteristics exhibit substantial departures from those described by such idealized formulations. The resulting deviation from the desired nominal image impedance causes a significant reduction in the return loss of the facility, causing signal reflections. These undesirable "echoes" dramatically reduce the amount of gain which can be inserted in the line before self-oscillation or "singing" occurs. For this reason, the reduction in return loss at higher repeater gains is particularly disadvantageous.

Figure 4:
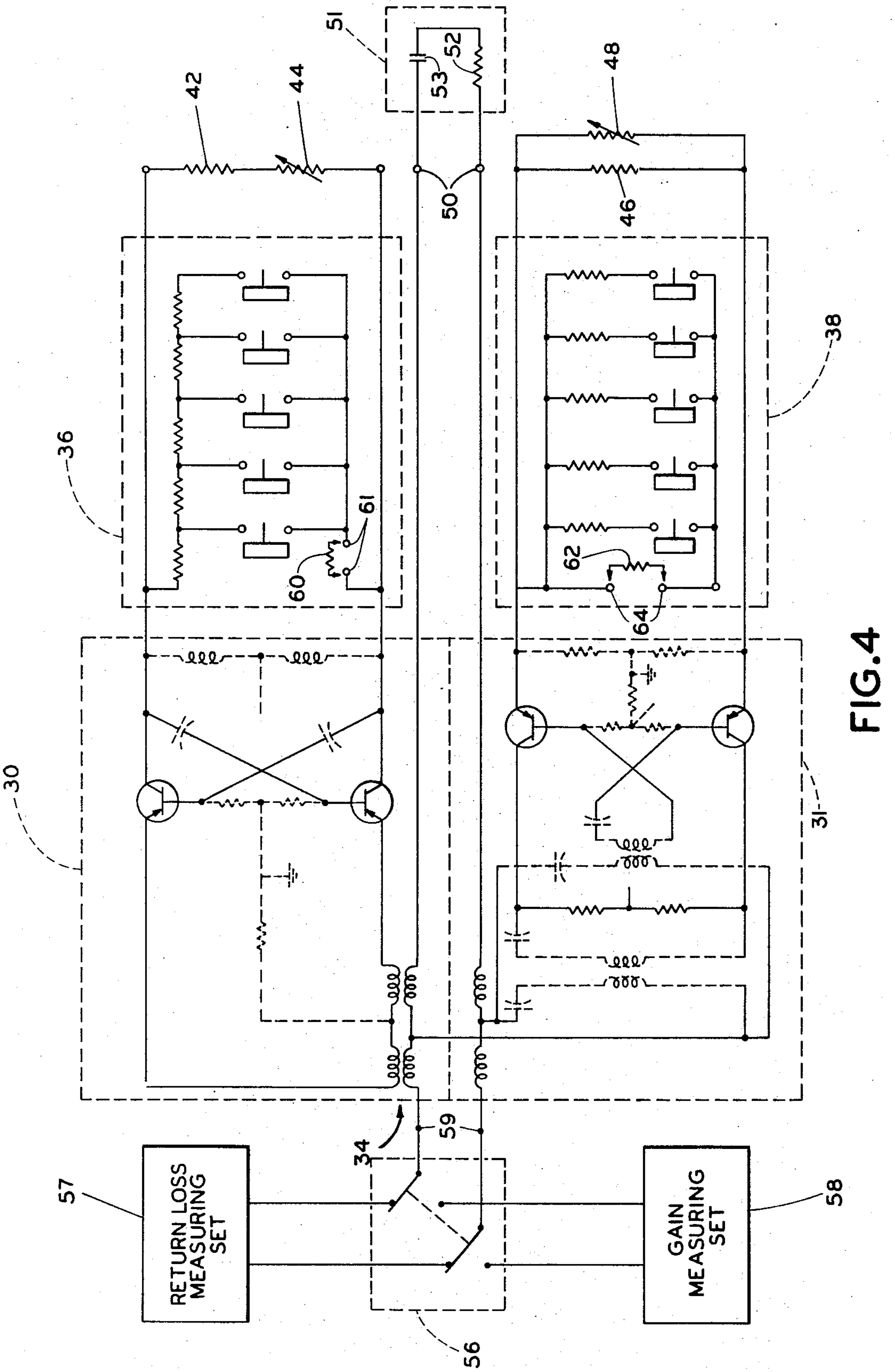
FIG. 4 is a schematic diagram illustrating the improved converter terminating networks, and the procedure employed for selecting the values of the impedance optimizing resistors included within such networks.

The novel repeater terminating network and the alignment procedure for setting the values of this network in accordance with the principles of the present invention may be more clearly understood by considering FIG. 4 of the drawings. In FIG. 4, a pair of conventional series-connected and shunt-connected negative impedance converters, shown respectively at 30 and 31, are connected to a balanced line transformer indicated generally at 34. The negative impedance converters themselves are well known and have been shown in FIG. 4 in simplified form. Details of their construction and operation are given in U.S. Pat. No. 3,042,759 which issued to A. L. Bonner on July 3, 1962.

In repeaters of the type described in the aforementioned Bonner patent, the reactive component of the overall impedance of the repeater is normally considered to be imparted solely by the shunt converter. The shunt converter includes a phase shifting network in its positive feedback path while the series converter does not. Both converters are terminated by pure resistances.

As seen in FIG. 4 the series-connected converter 30 is terminated by a strapping network indicated generally at 36, while the shunt-connected converter is terminated by a strapping network 38. During the initial alignment procedure, however, the networks 36 and 38 are "unstrapped" and present open circuits. The series-connected converter 30 is instead terminated by a precision fixed resistance 42 connected in series with a variable resistor decade 44. Similarly, the shunt-connected converter 31 is terminated by the parallel combination of a fixed precision resistor 46 and a variable decade 48.

As will be seen, the fixed resistors 42 and 46 are employed to set the overall gain of the repeater at a desired level whereas the variable decades 44 and 48 have no substantial influence on gain, but instead are employed to optimize the image impedance of the overall repeater.

During alignment, the repeater's transmission line terminals 50 are terminated with a load 51 shown as the series combination of a 900 ohm resistor 52 and a 2.16 microfarad capacitor 53. A switching arrangement 56 allows a return loss measuring set 57 or a gain measuring set 58 (both of conventional design) to be alternatively connected to the transmission line terminals 59 of the repeater. Both measuring sets 57 and 58 have an output impedance equal to the nominal image impedance.

Alignment of the repeater may then be advantageously carried out as follows:

1. With the strapping networks 36 and 38 effectively disconnected from the repeater, precision resistors 42 and 46 and decades 44 and 48 alone control the gain and impedance of the repeater. Because the value of precision resistor 42 is much larger than the value of series decade 44, and because the value of resistor 46 is much less than that of parallel decade 48, decades 44 and 48 have little influence on the overall gain of the repeater. The values of resistors 42 and 46 are selected such that the gain of the repeater is approximately 75 to 80 percent of the maximum gain obtainable from the repeater. For example, if the maximum gain obtainable from the given repeater is 13 db, the values of the fixed precision resistors 42 and 46 values are selected to set the gain of the overall repeater at approximately 10 db.

2. With the return loss measuring set 55 connected to the repeater, resistor decades 44 and 48 are adjusted until the highest return loss is obtained. In practice, it has been found that more than one set of settings of the two decade resistors will provide maximum return loss.

3. The gain of the combined repeater is then measured using the gain measuring set 58. If the gain is found to deviate from the nominally prescribed gain by more than a desired amount (for example, by more than ±0.3 db from the 10 db gain determined by fixed resistors 42 and 46), decades 44 and 48 may be readjusted until both maximum return loss and an acceptable gain level is reached.

4. A fixed resistor 60 having a value substantially equal to the final setting at decade 44 is then permanently connected to terminals 61 within the series strapping network 36. In the same way, a fixed resistor 62 is connected to the terminals 64 within the strapping network 38. The temporary alignment resistors 42–48 are then disconnected (as is the dummy load 51 and the measuring sets 60 and 62), and the repeater is then ready for shipment to the field and ultimate installation. After the gain of the repeater in a particular application is determined, the strapping networks 36 and 38 are then adjusted (by tightening one or more of the circuit-completing contact screws in each network) as prescribed by a strapping table, thereby providing the desired gain level. Factory-installed resistors 60 and 62 connected in the networks 36 and 38 respectively, continue to enhance the performance of the repeater and improve the quality of transmission by providing increased return loss at higher gain settings.

It is to be understood that the particular terminating networks and procedures which have been described are merely illustrative of one application of the principles of the invention. Numerous modifications may be made without departing from the true spirit and scope of the invention.

What is claimed is:

1. A process for aligning a telephone repeater of the type including both series-connected and shunt-connected negative impedance converters, each converter being provided with a strapping network of interconnectable resistors, said repeater being provided with line terminals for connecting said repeater in series with a two-wire transmission link having a predetermined nominal impedance, said process comprising, in combination, the steps of;

connecting first and second temporary terminating resistance circuits to said series-connected and said shunt-connected converters respectively, each of said circuits having a fixed resistance component for setting the overall gain of said repeater at a predetermined level and a variable resistance component for altering the impedance characteristics of said repeater without substantially changing its gain;

terminating said line terminals of said repeater with said predetermined nominal impedance;

connecting a return loss measuring device to the repeater thus terminated;

adjusting the value of said variable resistance component until the return loss as indicated by said measuring device is substantially maximized; and interconnecting in each of said strapping networks a permanent fixed resistor having a value substantially equal to the value of said variable component in the corresponding one of said temporary circuits at the time said measured return loss is maximized.

2. The process of claim 1 wherein said fixed resistance component of each of said temporary circuits is effective to set the gain of the connected converter at a nominal level approximately equal to 75 to 80 percent of the maximum gain capability of said converter.

3. The process of claim 2 further including the steps, following the maximization of said measured return loss, of measuring the overall gain of said repeater and readjusting said minor components to different settings providing maximum measured return loss if the measured gain of said repeater at the original settings departs from said nominal level by more than a predetermined amount.

4. A process for manufacturing a telephone repeater of the type comprising series-connected and shunt-connected negative impedance converters each terminated by a gain-controlling strapping network of interconnectable resistors, said repeater being provided with line terminals for serially connecting said repeater with a bi-directional two-wire telephone transmission link having a predetermined nominal image impedance, said process comprising, in combination, the steps of;

terminating said line terminals with a temporary load of said predetermined nominal image impedance;

terminating each of said converters with a temporary resistive circuit having a fixed major component for setting the gain of the connected converter at a predetermined level and having a variable minor component;

varying said minor component in each of said temporary resistive circuits while measuring the return loss of said repeater until the measured return loss is maximized; and interconnecting in each of said strapping networks a permanent fixed resistor having a value substantially equal to the value of said variable component in the corresponding one of said temporary resistive circuits at the time said measured return loss is maximized.

5. The process of claim 4 wherein said fixed major component of each of said temporary networks is effective to set the gain of the connected converter at a nominal level approximately equal to 75 to 80 percent of the maximum gain capability of said converter.

6. The process of claim 5 further including the steps, following the maximization of said measured return loss, of measuring the overall gain of said repeater and readjusting said minor components to different settings providing maximum measured return loss if the measured gain of said repeater departs from said nominal level by more than a predetermined amount.

7. In a telephone repeater of the type comprising series-connected and shunt-connected negative impedance converters each terminated by a gain-controlling strapping network of interconnectable resistors, said repeater being provided with line terminals for serially connecting said repeater with a bidirectional two-wire telephone transmission link having a predetermined nominal image impedance, the improvement, comprising a permanent fixed resistor interconnected in each of said strapping networks, the value of said resistance being determined by the process comprising, in combination, the steps of;

terminating said line terminals with a temporary load of said predetermined nominal image impedance;

terminating each of said converters with a temporary resistive circuit having a fixed major component for setting the gain of the connected converter at a predetermined level and having a variable minor component;

varying said minor component in each of said temporary resistive circuits while measuring the return loss of said repeater until the measured return loss is maximized; and setting the value of each of said permanent fixed resistors equal to the value of said variable component in the corresponding one of said temporary resistive circuits at the time said measured return loss is maximized.

8. The improvement of claim 7 wherein said fixed major component of each of said temporary networks is effective to set the gain of the connected converter at a nominal level approximately equal to 75 to 80 percent of the maximum gain capability of said converter.

9. The improvement of claim 8 wherein the process of determining the value of said fixed resistors further includes the step following the maximization of said measured return loss, of measuring the overall gain of said repeater and readjusting said minor components to different settings providing maximum measured return loss if the measured gain of said repeater departs from said nominal level by more than a predetermined amount.

* * * * *